(12) United States Patent
Anderson

(10) Patent No.: US 6,616,193 B2
(45) Date of Patent: Sep. 9, 2003

(54) VENTILATING SYSTEM CONNECTOR ASSEMBLY AND METHOD OF USE

(75) Inventor: Dean D. Anderson, Pierson, MI (US)

(73) Assignee: Kool, L.L.C., Jenison, MI (US)

( * ) Notice: Subject to any disclaimer, the term of this patent is extended or adjusted under 35 U.S.C. 154(b) by 0 days.

(21) Appl. No.: 09/968,998

(22) Filed: Oct. 3, 2001

(65) Prior Publication Data

US 2003/0062720 A1 Apr. 3, 2003

(51) Int. Cl.⁷ ................................................. F16L 27/00
(52) U.S. Cl. ...................... 285/140.1; 285/210; 285/921
(58) Field of Search ................................ 265/208, 209, 265/210, 140.1, FOR 143, 139.1, 921

(56) References Cited

U.S. PATENT DOCUMENTS

| | | |
|---|---|---|
| 482,808 A | 9/1892 | McGoron |
| 1,849,604 A * | 3/1932 | Weatherhead ................ 411/352 |
| 1,890,348 A * | 12/1932 | Weatherhead ................ 411/352 |
| 3,477,745 A | 11/1969 | Williams et al. |
| 3,643,987 A * | 2/1972 | DuPont ........................ 285/205 |
| 4,123,093 A | 10/1978 | Newland |
| 4,396,359 A * | 8/1983 | Kropiwnicki ............. 285/140.1 |
| 4,569,110 A | 2/1986 | Goettel |
| 4,575,133 A * | 3/1986 | Nattel .......................... 285/319 |
| 4,903,995 A * | 2/1990 | Blenkush et al. .............. 285/38 |
| 5,538,293 A | 7/1996 | Kolt |
| 5,692,783 A * | 12/1997 | Watanabe et al. .............. 285/61 |
| 6,179,340 B1 * | 1/2001 | Adolf et al. .............. 285/140.1 |
| 6,406,068 B1 * | 6/2002 | Bartholoma et al. ........ 285/210 |

FOREIGN PATENT DOCUMENTS

| | | | | |
|---|---|---|---|---|
| GB | 2065812 | * | 7/1981 | ........ 285/FOR 143 |
| JP | 2-85594 | * | 3/1990 | |
| NL | 7503236 | * | 9/1976 | ........ 285/FOR 143 |

* cited by examiner

*Primary Examiner*—Eric K. Nicholson
(74) *Attorney, Agent, or Firm*—Clark & Brody

(57) ABSTRACT

A connector assembly for a heating, ventilating, air conditioning system includes a take-off pipe and a collar. The take-off pipe is cylindrical in shape and has a number or outwardly extending resilient tabs and grooved outer wall segments. The collar is cylindrically sized to mate with the take-off pipe, and has a number of protrusions extending from an inner wall. The take-off pipe is first inserted into an opening in a main duct, with the resilient tabs retaining the take-off pipe in place. The collar slides over the body with the protrusions engaging one of the grooves of the wall segments to retain the collar in place. Rotation of the collar disengages the protrusions from the grooves for collar removal.

19 Claims, 4 Drawing Sheets

VENTILATING SYSTEM CONNECTOR ASSEMBLY AND METHOD OF USE

FIELD OF THE INVENTION

The present invention is directed to a ventilating system connector assembly, and particularly, to a two part assembly that permits a rapid and simple connection between a secondary duct and a main duct.

BACKGROUND ART

In the prior art, various connectors have been proposed in the field of heating, ventilating and air conditioning (HVAC) systems in order to tap into a main plenum or duct of a ventilating system. Typically, an opening is made in the main duct, and a take-off pipe or pipe assembly is attached to the opening. The pipe or assembly allows a secondary duct to be attached to the main duct.

In U.S. Pat. No. 482,808, to McGoron, the take-off pipe employs a fixed collar on one end with bendable flanges on the other end for attachment to the main flue.

U.S. Pat. No. 3,477,745 to Williams et al. discloses a quick connection between a take-off pipe and a duct panel. The quick connection is attained by including a cutter on the take-off pipe that cuts a hole in the duct panel. A helical retainer member having one end free of the pipe follows the cutter through the panel to the opposite side thereby securing the take-off pipe to the panel.

U.S. Pat. No. 5,538,293 to Kolt describes a method for installing a secondary duct to a main duct. In one embodiment, a tapered take-off pipe employs a number of outwardly extending resilient lanced projections. The projections are initially pressed inward when the take-off pipe is inserted into an opening made in the main duct. After passing the opening, the projections snap outwardly to prevent subsequent removal of the take-off pipe.

While a number of different ways have been proposed to attach a take-off pipe to a main duct or panel, a number of disadvantages remain. The method of Kolt requires a tapered shape and projections to give a tight fit, and is susceptible to leaking over time. The Williams method requires that the take-off pipe be made with a cutter. Often times, installers are left with conventional take-off pipes and must perform cutting, hand fitting, tapping, sealing and other time consuming steps to attach the pipe to a main duct or pane.

Accordingly, a need exists for improved methods and designs to attach a secondary duct to a main duct using a take-off pipe or pipe assembly. The present invention responds to this need by providing a connector assembly and method of use which allows for rapid and efficient attachment and removal of secondary ducts to main ducts.

SUMMARY OF THE INVENTION

Accordingly, it is a first object of the present invention to provide a connector assembly for attaching a secondary duct to a main duct.

Another object of the present invention is a method of attaching a secondary duct to a main duct using a connector assembly employing a two piece design.

A still further object of the invention is a connector assembly for HVAC application comprising a take-off pipe and a collar, the take-off pipe designed to easily attach to a main duct, and further connect to the collar to facilitate attachment of a secondary duct to the main duct.

Other objects and advantages of the present invention will become apparent as a description thereof proceeds.

In satisfaction of the foregoing objects and advantages, the present invention is an improvement in connectors for HVAC systems whereby a secondary duct is to be connected to a main duct. The inventive ventilating system connector assembly comprises a take-off pipe having a generally cylindrical body with at least one resilient tab extending outwardly from the body. The body also has at least one set of grooves in a body wall. The assembly also includes a generally cylindrical collar sized to mate with the body of the takeoff pipe, the collar having at least one protrusion extending outwardly from the collar. The protrusion is adapted to engage the at least one groove of the groove set to attach the collar to the take-off pipe in a first position, and be circumferentially spaced from the groove set in a second position.

The take-off pipe body can have a plurality of spaced apart grooved wall segments and a plurality of spaced apart tabs, and the collar can have a plurality of the spaced apart protrusions. Each protrusion is spaced apart on the collar to engage respective grooves of the wall segments when the collar is mated with the body. The resilient tabs can be equally spaced apart with the grooved wall segments being positioned between adjacent resilient tabs. The grooves of each wall segment extend along a circumferential path for a defined distance, and are aligned longitudinally along the wall segment.

The collar can have an attachment flange surrounding one end thereof with a plurality of spaced apart openings to receive fasteners for attachment to the main duct.

The invention also includes a method of attaching the take-off pipe and collar connector assembly to a main duct. The method entails first making an opening in a portion of the main duct using conventional means. Then, one end of the take-off pipe is inserted into the opening, the tabs being depressing by reason of their resiliency. Once the edge of the tab passes through the opening, the tab then extends outwardly, thus securing the takeoff pipe end into the opening. The cylindrical collar is mated with the take-off pipe extending from the main duct such that the protrusions thereon engage a groove in the body wall to attach the collar to the take-off pipe. The collar can have an attachment flange to facilitate fastening to the main duct using adhesives, fasteners, a combination of both, or the like. A secondary duct can then be secured to the assembly in conventional fashion.

For removal, the cylindrical collar is rotated to disengage the protrusions from the grooves so that the collar can be removed from the take-off pipe.

BRIEF DESCRIPTION OF THE DRAWINGS

Reference is now made to the drawings of the invention wherein.

DESCRIPTION OF THE PREFERRED EMBODIMENTS

The present invention offers significant improvements in the field of HVAC systems and the attachment of secondary ducts to main ducts using take-off pipes or assemblies. Using the inventive connector assembly, the attachment time for connecting or disconnecting a secondary duct is drastically reduced, thereby improving the profitability of the installer as well as the builder of the structure employing the HVAC system. What once took a considerable amount of time to install a number of take-offs in an HVAC system, is now vastly reduced in time by the elimination of many of the time consuming steps associated with prior art techniques and connectors.

Figure 1:
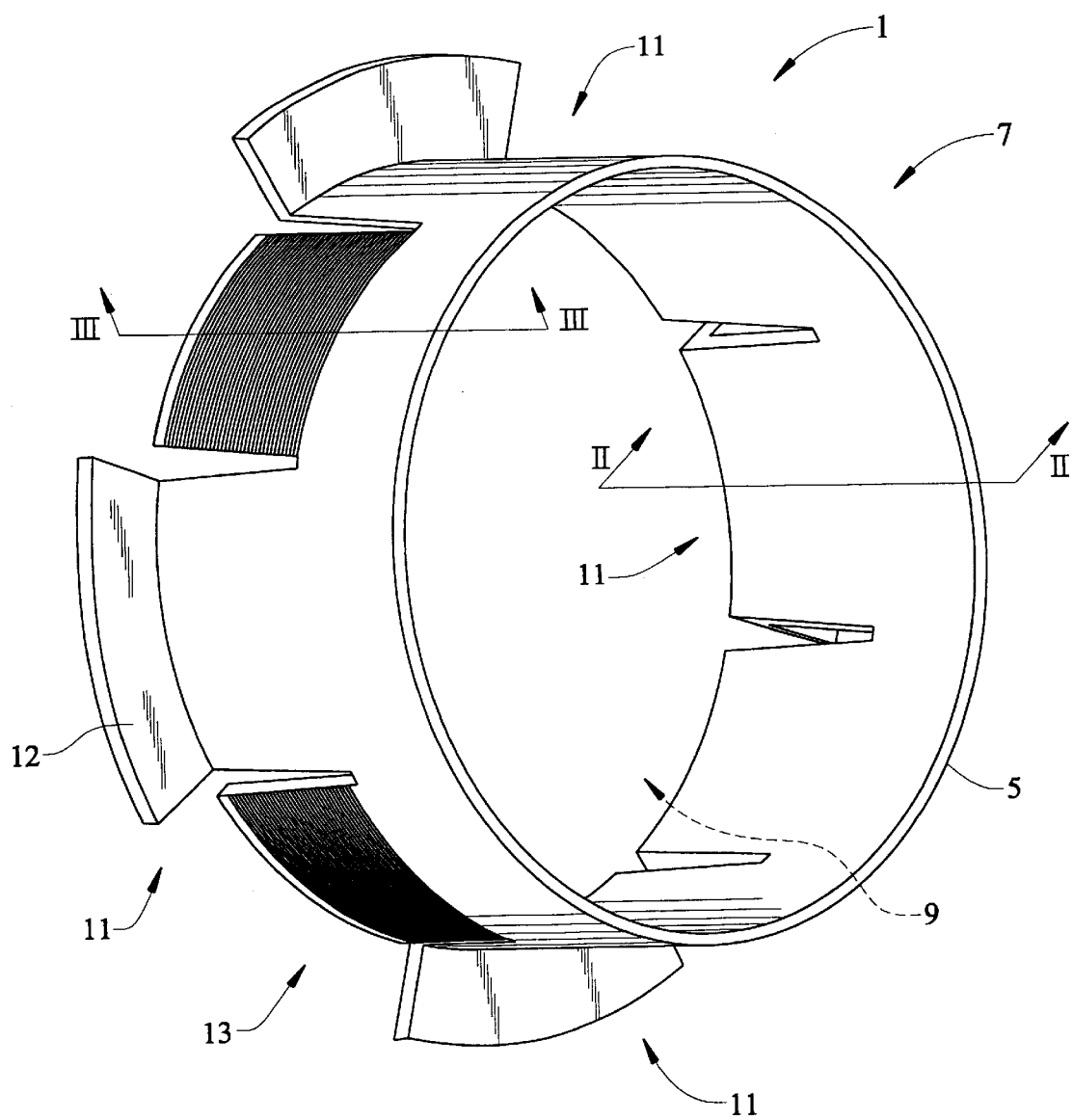
FIG. 1 is a perspective view of a take-off pipe as one part of the inventive assembly.
Figure 2:
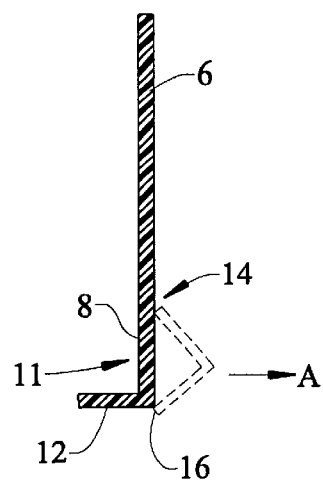
FIG. 2 is a cross sectional view along the line II—II of FIG. 1.
Figure 3:
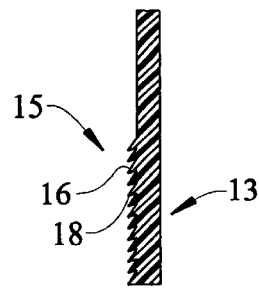
FIG. 3 is a cross sectional view along the line III—III of FIG. 1.

Referring to FIGS. 1–4, the connector assembly of the invention comprises two parts, a take-off pipe 1 and a collar 3. The take-off pipe 1 has a generally cylindrical body 5 having opposing ends 7 and 9. The body 5 is shown with a number of resilient tabs 11 at spaced apart intervals along the circumference of the body 5, adjacent edge 14. Each tab 11 is L-shaped and resilient in that it can be pressed in the direction of arrow "A", when fitting to a main duct, see FIG. 2. The tab can be depressed by pressing on the tab leg 12, or the portion 8 aligned with the body 5. When moved, the tab leg 12 rotates or pivots about point 14. In a preferred mode, the tabs 11 can be cut out of the body 5 so that they are at rest as shown in FIG. 2, with leg 12 being perpendicular to the body wall 6. Of course, other tabs could be utilized that would be capable of moving in the same manner, i.e. being pressed inwardly and then rebounding or recovering to their original configuration. In one embodiment, the tab leg 12 could be acutely angled with respect to the wall 6, such that the leg 12 would pivot at point 16 to allow entry into an opening in a main duct. It should be understood that other resilient tab designs can be employed that would allow the body 1 to pass through an opening in the main panel or duct, with the tab expanding back to an at rest position to prevent removal of the body from the opening unless done by manipulation of the tab.

The body 5 also has a grooved outer wall, comprising a number of grooved wall segments 13 circumferentially spaced between the tabs 11 as shown in FIG. 1. The grooved segments 13 could be made with grooves that would occupy less of the circumferential space between the tabs 11 if desired. The wall segments 13 have a number of grooves 15 extending along a longitudinal length of the wall segment. Each groove 15 has a top side 16 and an underside 18, which cooperates to fix the collar to the take-off pipe as described below.

Figure 4:
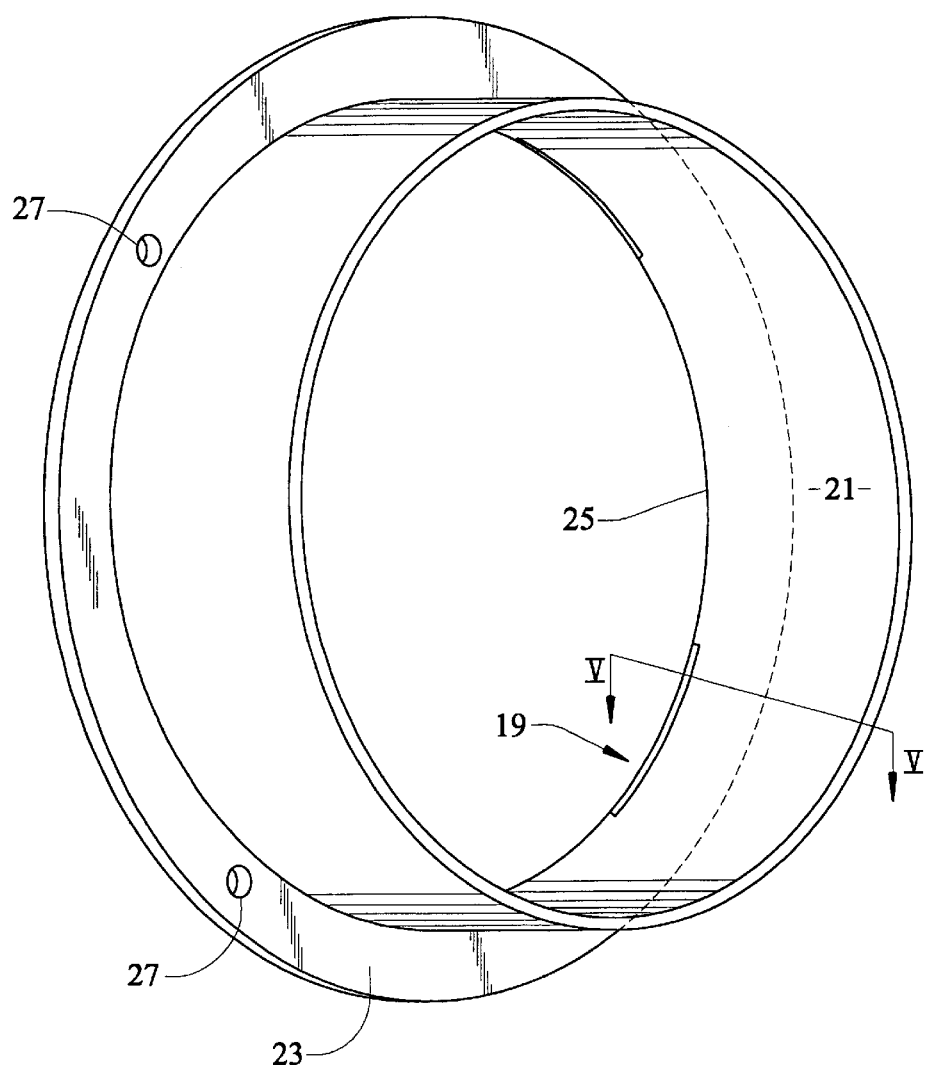
FIG. 4 is a perspective view of a collar as a second part of the inventive assembly.
Figure 5:
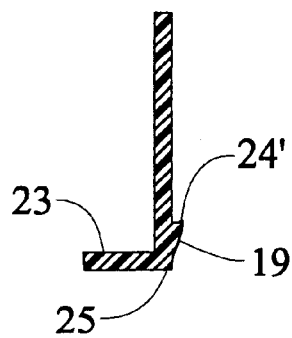
FIG. 5 is a cross sectional view along the line V—V of FIG. 4.

Referring to FIGS. 4 and 5, the collar 3 is also generally cylindrical in shape, and is sized to mate with the take-off 1 by sliding over it.

The collar 3 has a number of protrusions 19 extending from the inner wall 21. The protrusions 19 can be formed in any manner, but are preferably formed from the collar material itself. Each protrusion has a distal edge 24, which is designed to slide over the top sides 16 of the grooves 15 and engage the underside 18 of one groove of the wall segment 13 to secure the collar 3 to the take-off pipe 1. Protrusions 19 may engage grooves along any part of the segment 13 depending on where the protrusions are formed with respect to the edge 25 of the collar 3. In FIG. 4, the protrusions are shown formed adjacent the edge 25, but other locations, and configurations of protrusions could be employed. In fact, any protrusion capable of engaging one of the grooves can be used. Further, multiple protrusions for each wall segment could also be employed to provide a more secure engagement between the take-off pipe 1 and the collar 3.

The collar 3 can also be made with a flange 23 surrounding the end 25. The flange can have a number of through openings 27, to enable the collar to be fastened to a main duct using fasteners such as screws, rivets, and the like, or even adhesives. It should be understood that the collar can be made without the flange is so desired. In this mode, the edge 25 of the collar could rest on the surface of the main duct, and duct tape or other sealing means could be employed to make a leak-free connection. Further, the flange 23 can be a continuous type as shown or be made as a number of discrete sections spaced around the periphery of the end of the collar 3.

It is preferred that the collar and take-off pipe be made of a non-metallic material such as a polymer or plastic material, but other materials such as metals could also be utilized.

Figure 6:
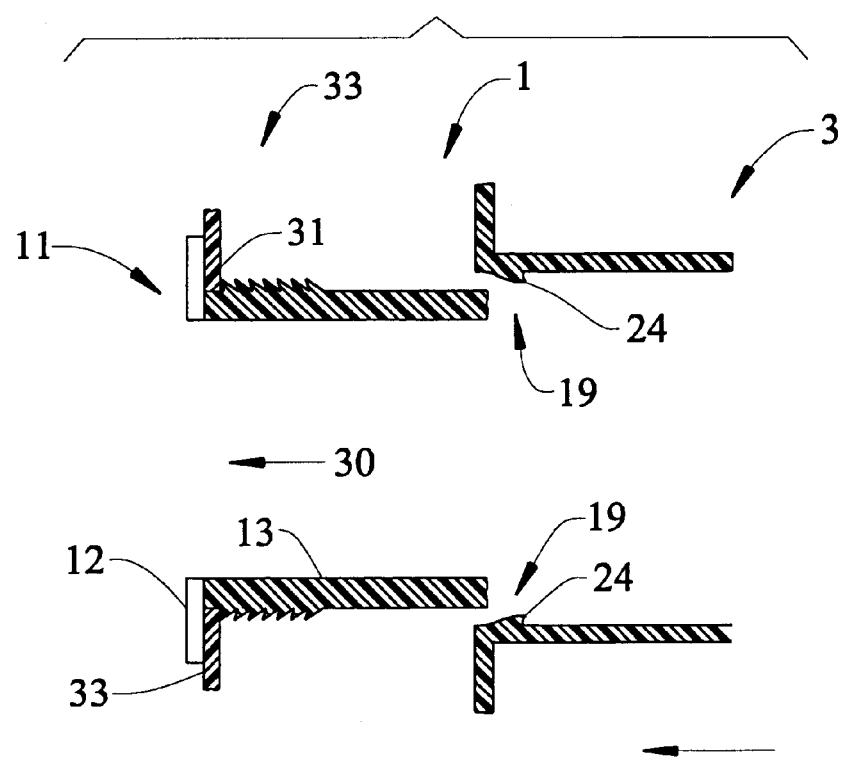
FIG. 6 is a sectional view of the connector assembly unassembled.

The method of using the collar and take-off is best illustrated with reference to FIGS. 6–8. In FIG. 6, an opening 30 is cut into a portion 31 of a main duct 33. The take-off pipe 1 is inserted into the opening 30 with the tabs 11 being manually depressed during the insertion step. Once the tabs 11 translate beyond the opening, they expand to their at rest position (see FIG. 1), and the take-off pipe 1 is secured to the main duct. In a preferred mode, the pipe is inclined with respect to the opening so that a pair of the tabs can be inserted into the opening. Then, only one pair needs to be depressed to insert the entire pipe into the opening. In this mode, only one hand is needed to depress the second pair of tabs for installation.

Figure 7:
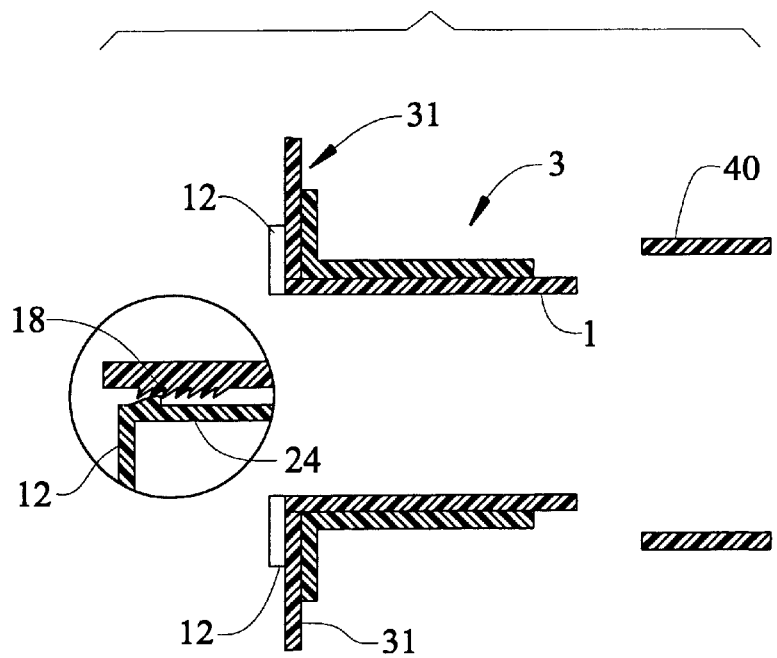
FIG. 7 is a sectional view of the connector assembly assembled.
Figure 8:
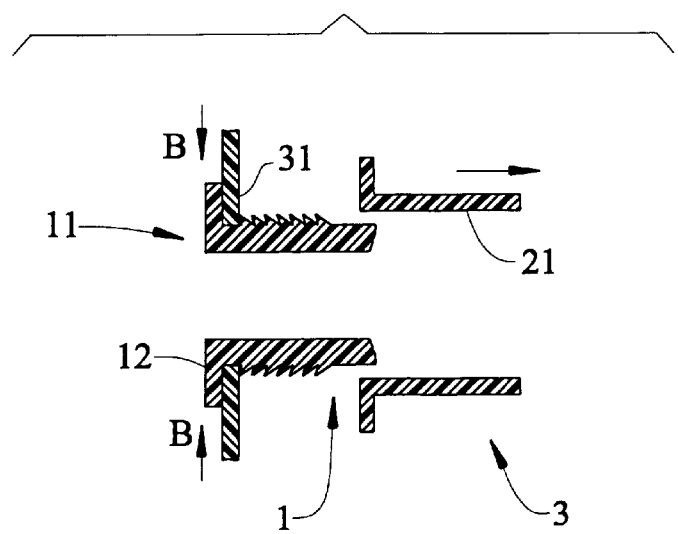
FIG. 8 is a sectional view of the connector assembly with the collar rotated and removed.

In FIG. 7, the collar 3 is then inserted over the take-off pipe 1 with the protrusions 19 aligned with the wall segments 13. During this step, the protrusions 19 engage and pass along the groove top sides 16 until the collar edge 25 rests against the portion 31 of the main duct 33. The collar 3 is continually forced against the portion 31 until the protrusion edges 24 lock against the undersides 18 of the grooves so that the collar 3 is firmly in place on the take-off pipe 1, and the entire assembly is firmly secured to the main duct portion 31. With this method, installation is fast and efficient, there is no need for special installation steps, just cutting the opening in the main duct, inserting the take-off pipe, and then pressing the collar on the take-off pipe in the proper alignment. A secondary duct 40 can then be attached to the assembly 1 in a conventional way.

Removal is just as easy. Referring to FIG. 8, to remove the collar 3 and take-off pipe 1, the collar 3 is rotated so that the grooved wall segments 13 are displaced from their respective protrusions 19. With this rotation, the smooth part of the inner wall 21 of the collar 3 aligns with the grooved wall segments 13, the protrusions face the smooth outer surface between the grooves, and the collar 3 can slide off the take-off pipe 1. The protrusions are displaced so that they do not engage the undersides 18 of the grooves 15. Then, the tabs 11 can be depressed manually as shown by arrows "B", and the take-off pipe 1 can be removed from the opening 30.

While the disclosed embodiment shows equally spaced apart protrusions 19, grooved wall segments 13, and resilient tabs 11, other arrangements could be employed without departing from the scope of the invention. For example, eight resilient tabs could be employed along with eight wall segments and protrusions.

It is preferred that the resilient tabs 11 extend from the edge 14 of the body so that a minimum of take-off pipe extends into the main duct. Of course, other resilient tabs designs could be employed such that a larger portion of the take-off pipe would extend into the main duct if so desired.

While the grooves are shown extending along only a part of the longitudinal length of the segments 13, the grooves could cover the entire portion thereof if the protrusion were located in a different position on the wall 21 of the collar. Again, the location and spacing of the grooves should relate to the positioning of the protrusions and vice versa so that the protrusions and grooves can selectively engage each other for collar attachment and removal.

While a number of protrusions are shown, it is possible that one protrusion and one corresponding grooved wall segment could also be employed. In this arrangement, the grooved part of the body could span about half the circumference of the body 1 with the protrusion spanning about half of the circumference of the inner wall 21 of the collar. However, it is preferred to use a number of protrusions to afford a more uniform locking between the body 1 and the collar 3. If a permanent installation was preferred wherein removal of the collar was not a concern, either the grooved wall segment or protrusions could extend around the entire circumference of the body. In this embodiment, rotation of the collar would not allow collar removal since there would be no space for disengagement of grooves and protrusions. No matter what the extent of rotation, the protrusion(s) would remain in the groove(s).

As such, an invention has been disclosed in terms of preferred embodiments thereof which fulfills each and every one of the objects of the present invention as set forth above and provides a new and improved connector assembly for attaching a secondary duct to a main duct.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A ventilating system connector assembly comprising:
   a) a take-off pipe having a generally cylindrical body with at least one resilient tab, a portion of the tab extending outwardly from the body, and at least one set of grooves on a body wall;
   b) a generally cylindrical collar sized to mate with the body of the take-off pipe, the collar having at least one protrusion extending outwardly from the collar, the at least one protrusion adapted to engage at least one groove of the at least one set of the grooves to attach the collar to the take-off pipe in a first position.

2. A ventilating system connector assembly comprising:
   a) a take-off pipe having a generally cylindrical body with at least one resilient tab, a portion of the tab extending outwardly from the body, and at least one set of grooves on a body wall;
   b) a generally cylindrical collar sized to mate with the body of the take-off pipe, the collar having at least one protrusion extending outwardly from the collar, the at least one protrusion adapted to engage at least one groove of the at least one set of the grooves to attach the collar to the take-off pipe in a first position, wherein the take-off pipe has a plurality of spaced apart grooved wall segments and a plurality of spaced apart tabs, and the collar has a plurality of the spaced apart protrusions, each protrusion spaced apart on the collar to engage respective grooves of the wall segments when the collar is mated with the body, and be separated from the grooves when the collar is rotated so that the protrusions are positioned between the grooved wall segments.

3. The assembly of claim 1, wherein the collar has an attachment flange surrounding one end thereof.

4. The assembly of claim 3, wherein the flange has a plurality of spaced apart openings to receive fasteners for attachment to the main duct.

5. The assembly of claim 2, wherein the resilient tabs are L-shaped and spaced apart equally, and the grooved wall segments are positioned between adjacent resilient tabs.

6. The assembly of claim 2, wherein the grooves are aligned longitudinally on at least a portion of the outer surface of each wall segment.

7. The assembly of claim 2, wherein the protrusions are positioned adjacent one of the opposing ends of the collar, and are equally spaced apart.

8. The assembly of claim 2, wherein the grooved wall segments are on an outer wall of the body, and the protrusions extend from an inner wall of the collar.

9. The assembly of claim 8, further comprising a secondary duct attached to the collar.

10. A method of attaching a take-off pipe and collar connector assembly to a main duct comprising the steps of:
    a) making an opening in a portion of the main duct;
    b) providing a take-off pipe, the take-off pipe having a generally cylindrical body with at least one tab, a portion of the tab extending outwardly from the body, and at least set of grooves on a body wall;
    c) depressing the at least one tab and inserting one end of the take-off pipe into the opening until an edge of the at least one tab passes through the opening and the tab then extends outwardly;
    d) placing a generally cylindrical collar having at least one protrusion extending from an inner wall of the collar over an end of the take-off pipe so that the at least one protrusion engages at least one groove in the at least one set of grooves to attach the collar to the take-off pipe.

11. A method of attaching a take-off pipe and collar connector assembly to a main duct comprising the steps of:
    a) making an opening in a portion of the main duct;
    b) providing a take-off pipe, the take-off pipe having a generally cylindrical body with at least one tab, a portion of the tab extending outwardly from the body, and at least set of grooves on a body wall;
    c) depressing the at least one tab and inserting one end of the take-off pipe into the opening until an edge of the at least one tab passes through the opening and the tab then extends outwardly;
    d) placing a generally cylindrical collar having at least one protrusion extending from an inner wall of the collar over an end of the take-off pipe so that the at least one protrusion engages at least one groove in the at least one set of grooves to attach the collar to the take-off pipe, wherein the take-off pipe has spaced apart sets of grooves, and the cylindrical collar is rotated to position the at least one protrusion between the sets of grooves for removal of the collar.

12. The method of claim 10, wherein the collar has an attachment flange, and the attachment flange is fastened to a portion of the main duct.

13. A method of attaching a take-off pipe and collar connector assembly to a main duct comprising the steps of:
  a) making an opening in a portion of the main duct;
  b) providing a take-off pipe, the take-off pipe having a generally cylindrical body with at least one tab, a portion of the tab extending outwardly from the body, and at least set of grooves on a body wall;
  c) depressing the at least one tab and inserting one end of the take-off pipe into the opening until an edge of the at least one tab passes through the opening and the tab then extends outwardly;
  d) placing a generally cylindrical collar having at least one protrusion extending from an inner wall of the collar over an end of the take-off pipe so that the at least one protrusion engages at least one groove in the at least one set of grooves to attach the collar to the take-off pipe, wherein the take-off pipe has a plurality of spaced apart grooved wall segments and tabs, and the collar has a plurality of spaced apart protrusions, and the tabs are depressed as part of step (c), and the protrusions engage grooves of the wall segments as part of step (d).

14. The method of claim 13, wherein the cylindrical collar is rotated to disengage the protrusions from the grooves of the grooved wall segments for removal of the collar.

15. A ventilating system connector assembly comprising:
  a) a take-off pipe having a generally cylindrical body with a plurality of spaced apart resilient L-shaped tabs extending outwardly from the body, and a plurality of spaced apart grooved wall segments;
  b) a generally cylindrical collar sized to mate with the body of the take-off pipe, the collar having a plurality of spaced apart protrusions extending outwardly from the collar and adjacent an edge thereof, the protrusions adapted to engage the grooves of the grooved wall segments to attach the collar to the take-off pipe in a first position, and be circumferentially spaced from the grooves in a second position for collar removal;
  c) an attachment flange extending from an end of the collar, the flange adapted to be secured to a portion of a main duct receiving the take-off pipe.

16. The assembly of claim 15, wherein the attachment flange has a number of spaced apart opening for attachment to the portion of the main duct.

17. The assembly of claim 16, wherein the take-off pipe and collar are non-metallic.

18. The connector of claim 11, wherein the at least one set of grooves is arranged on an outer surface of the generally cylindrical body and circumferentially adjacent the at least one resilient tab.

19. The method of claim 10, wherein step (b) further comprises providing a takeoff pipe wherein the at least one set of grooves is arranged on an outer surface of the generally cylindrical body and circumferentially adjacent the at least one resilient tab.

* * * * *